(12) United States Patent
Simpson (10) Patent No.: US 12,181,109 B2
(45) Date of Patent: Dec. 31, 2024

(54) CONSTANT PRESSURE GAS STORAGE IN CONTAINMENTS WITH MITIGATION FOR GAS DISSOLUTION PROBLEMS

(71) Applicant: CHEESECAKE ENERGY LTD., Nottingham (GB)

(72) Inventor: Michael Simpson, Nottingham (GB)

(73) Assignee: CHEESECAKE ENERGY LTD., Nottingham (GB)

( * ) Notice: Subject to any disclaimer, the term of this patent is extended or adjusted under 35 U.S.C. 154(b) by 75 days.

(21) Appl. No.: 17/642,005

(22) PCT Filed: Sep. 14, 2020

(86) PCT No.: PCT/IB2020/058522
§ 371 (c)(1),
(2) Date: Mar. 10, 2022

(87) PCT Pub. No.: WO2021/048829
PCT Pub. Date: Mar. 18, 2021

(65) Prior Publication Data
US 2024/0117938 A1    Apr. 11, 2024

(30) Foreign Application Priority Data
Sep. 14, 2019    (GB) ...................................... 1913299

(51) Int. Cl.
*F17C 5/06*        (2006.01)
*F03B 13/06*    (2006.01)
*H02J 15/00*    (2006.01)

(52) U.S. Cl.
CPC ................ *F17C 5/06* (2013.01); *F03B 13/06* (2013.01); *F17C 2205/0134* (2013.01);
(Continued)

(58) Field of Classification Search
CPC ................ F17C 5/06; F17C 2205/0134; F17C 2227/0135; F17C 2227/0157; F17C 1/007;
(Continued)

(56) References Cited

U.S. PATENT DOCUMENTS 4,691,524 A  *  9/1987  Holscher ................. F03B 13/00
                                                                60/398
8,806,866 B2     8/2014  McBride
(Continued)

FOREIGN PATENT DOCUMENTS

DE        102012023539 A       5/2014
GB             1913299.2 A1    9/2019
(Continued)

OTHER PUBLICATIONS

WO 2014079410 A2—English Translation (Year: 2014).*
International Search Report for PCT/IB2020/058522, Mailing Date of Jan. 13, 2021.

*Primary Examiner* — Craig M Schneider
*Assistant Examiner* — Christopher M Afful
(74) *Attorney, Agent, or Firm* — Fresh IP PLC; Clifford D. Hyra; Aubrey Y. Chen (57) ABSTRACT

Disclosed herein is a system for storing gas at almost constant pressure, which involves the injection and withdrawal of a liquid in a process known as hydraulic compensation. This disclosure teaches a way to minimize that dissolution by ensuring that, as the gas containment is charged up, the hydraulic compensation liquid emerges from the containment at the gas storage pressure and the pressure of that liquid is caused to fall in a number of discrete steps with settling volumes present at the nodes between these steps. These settling volumes enable some gas to come out of solution at each node having lost relatively small amounts of pressure. The gas is compressed back up to storage (Continued)

pressure and re-injected into the main storage containment without significant use of energy.

17 Claims, 3 Drawing Sheets

(52) U.S. Cl.
CPC ............. *F17C 2227/0135* (2013.01); *F17C 2227/0157* (2013.01); *H02J 15/006* (2013.01)

(58) Field of Classification Search
CPC . F17C 2270/0128; F03B 13/06; H02J 15/006; F04F 1/10; F04F 1/12; F04B 35/008; F02C 6/16
USPC .............................................. 141/59; 60/398
See application file for complete search history.

(56) References Cited

U.S. PATENT DOCUMENTS

| 9,045,209 | B2 | 6/2015 | Zeren |
| 9,109,512 | B2 * | 8/2015 | Ingersoll .................... F02C 6/16 |
| 2014/0000251 | A1 * | 1/2014 | McBride .................... F02G 1/02 60/327 |
| 2016/0273529 | A1 | 9/2016 | Stahlkopf |

FOREIGN PATENT DOCUMENTS

| WO | WO-2014079410 A2 * | 5/2014 | ............. F03B 13/06 |
| WO | PCT/IB2020/058522 A1 | 3/2021 | |

* cited by examiner

CONSTANT PRESSURE GAS STORAGE IN CONTAINMENTS WITH MITIGATION FOR GAS DISSOLUTION PROBLEMS

FIELD

This invention is applicable to all systems where a gas is intended to be stored within relatively rigid containment and the pressure of the stored gas is required to remain fairly constant. A common instance of this requirement occurs in compressed air energy storage systems where the pressurised air is stored either in tanks or in underground caverns.

BACKGROUND

It is very common for gases of various sorts to be stored in cylinders or other cavities such as salt caverns in pure gaseous form. We will refer to these storage volumes collectively as containments. These containments are normally relatively stiff compared with the internal gas. That is to say, if a small increment is made in the mass of stored gas, the proportionate increase in the volume of the containment is typically negligible compared with the increase in volume that would occur in the gas if that gas was allowed to expand back to its original pressure and retained the same temperature. In such cases, the pressure of the stored gas rises as the mass of stored gas increases. Conversely, the pressure of the stored gas falls as mass of stored gas reduces again. These containments are approximately "isochoric"—i.e. constant volume.

There are several disadvantages to isochoric containments for gas. These are especially noteworthy in the context of energy storage systems where air is stored within the containment. The most obvious disadvantage is that the machinery used to compress and expand the air must deal with a range of different storage pressures and it is difficult to design machines that have optimal, or near-optimal, performance over a range of different storage pressures. A second disadvantage is it will usually be impractical to withdraw more than about 50% of the maximum charge of air from the containment. One reason why this is impractical relates to the viability of the machinery for compression and expansion but a second reason is that the state of stress of the walls of the containment changes is affected by the internal pressure and large oscillations in this state of stress can cause material damage in the walls. This is especially relevant in underground caverns formed in bedded salt or other rocks where very high compressive stresses may occur in the cavern walls if the cavern pressure falls too low with the result that collapse can begin to occur. A third disadvantage relates to heat transfer. If storage pressure falls as air is withdrawn during a discharging process, the temperature of the stored air also tends to fall and heat leaks into the stored air through the cavern walls. The opposite happens during charging where the stored air tends to rise in temperature and heat leaks back out. The net effect of this heat transfer over a complete charge-discharge cycle is a loss of exergy and this loss of exergy translates itself into a loss of turnaround efficiency in the energy storage process.

Isobaric (constant pressure) storage of the gas resolves all of the above problems. The compression/expansion machinery can operate with the same pressures on inlet and exhaust at all states of charge and discharge. The state of stress of the containment walls stays (almost) constant and the temperature of the stored gas is not inclined to change.

The attractions of isobaric storage are widely understood and there are several ways in which this can be achieved. One commonly-proposed method is to use hydraulic compensation. Hydraulic compensation involves pumping in an incompressible liquid such as water into the containment to displace gas as gas is being withdrawn and conversely allowing the water to be driven back out of the containment as gas is being re-introduced into the containment. A pump drives the liquid into the containment whilst pressurised gas is being discharged and clearly this pump absorbs mechanical power but the amount of power used by the pump is far lower (typically 5-10 times lower) than the work done by the air being exhausted. When the system is charging again, liquid is driven out again and most of the work done to pump the liquid into the containment can be recovered as the liquid flows from the high-pressure containment into a holding tank at or near to ambient-pressure. For obvious reasons of cost, the most popular candidate liquid is water. In some implementations, the holding tank for the compensation liquid may be at a height far above the cavern and the hydrostatic head associated with the height difference provides and recovers most, if not all, of the work required to drive the compensation liquid into the containment containing the pressurised gas. FIG. 2 in the 2009 paper by Nielsen and Leithner in WSEAS Transactions on Power Systems shows a clear image of such a system.

Most implementations of hydraulic compensation do not attempt to include an impermeable barrier between the liquid and the stored gas. It is possible to introduce either a moving piston between the two fluids or a bladder to separate them but this adds additional complexity and expense. Embodiments of the present invention relate to arrangements where there is not a complete and impermeable separation between the two fluids in an isobaric gas containment where the isobaric effect in the containment is achieved by hydraulic compensation.

An issue with these hydraulic compensation arrangements that is scarcely ever addressed is the dissolution of the stored gas in the liquid. Water at atmospheric pressure and 10° C. contains roughly $23 \times 10^{-6}$ air by mass. That is to say, every litre of water (1 litre weighs 1 kg) contains 0.023 g of air. This is equivalent to approximately 18.4 ml of air at standard conditions. The amount of air dissolved in water increases linearly with pressure. Henry's law expresses this fact.

Thus, water at 250 bar that is in equilibrium with air above it will have the equivalent of 18.4 ml of air (1.84% of one litre) at the elevated pressure. Thus, a containment for storing pressurised air at 250 bar at ~10° C. that uses water as a hydraulic compensation fluid will allow approximately 1.83% of the full tank capacity for stored air to escape via the water as the containment is filled with air from empty. As the water leaves the containment, it carries away 1.84% of the entire containment capacity of the air. The water pumped back into the containment contains only 0.4% as much air as the water that was taken out. This could account for a reduction of 1.83% in the round-trip efficiency of a compressed air energy storage system in addition to the other losses. Clearly this is quite significant.

The extent of air dissolution in water becomes more marked as temperature decreases. This is especially significant in light of the fact that the real gas properties of several gases including air mean that there is a very strong economic motivation for storing the gas at a reduced temperature. Patent application GB1908021.1 teaches that storing air at a temperature of approximately −40° C. is highly advantageous in terms of the amount of air that can be held in a given set of steel pressure vessels. Clearly, pure water would be frozen at this temperature but there are numerous inexpensive water-based salt solutions that remain liquid at this temperature. In such applications, using straightforward hydraulic compensation could account for losses in the order of 3% of the stored air via air escape through the hydraulic compensation liquid.

Hydraulic compensation itself is a very well-established concept and it is mentioned in many published patent applications. One of the earliest to mention hydraulic compensation in conjunction with compressed air energy storage is U.S. Pat. No. 3,895,493 by Rigollot from 1975. In U.S. Pat. No. 3,895,493, the hydraulic compensation is achieved using a lake (the paper by Nielson and Leithner mentioned above refers to this as a "shuttle pond") filled with water with a direct connection to the bottom of an underground sealed cavern. Rigollot recognises that air will dissolve in water used for hydraulic compensation and his patent addresses a possible instability whereby pressure swings self-excite in the underground cavern. Water leaving the cavern becomes less dense (because air forms bubbles in the water column at the higher levels) and water entering the cavern is denser because there are no such bubbles. U.S. Pat. No. 3,895,493 sets out a possible solution to this instability but it does not address the main issue resolved by embodiments of the present invention which relate to the loss of compressed gas via the hydraulic compensation liquid. In the context of a compressed air energy storage plant, this loss of gas translates directly to a loss of recoverable energy. In the context of storing other gases such as natural gas, it obviously translates to a loss of a valuable (and environmentally-harmful) gas into the atmosphere.

Many other patents rely on hydraulic compensation though most do not refer to it directly using the term. These include, CN108895017(A), CN107905985(A), CN106401907(A), CN106224756(A), WO2016012764 (A1), CN104121049(A), CN104005802(A) and CN203584748(U). The present invention is not hydraulic compensation itself. Rather, at least one embodiment is a system for reducing the loss of stored gas as the main gas containment is filled and the hydraulic compensation liquid is expelled.

SUMMARY

The concept behind embodiments of this invention is that the pressure difference that occurs in the continuous liquid line between the main constant-pressure gas containment and the external storage volume for the hydraulic compensation liquid is divided into a multiplicity of steps. At each intermediate pressure, there is a settling volume for the hydraulic compensation liquid. The upper portion of that settling volume is sometimes occupied by gas. The settling volumes are very small relative to the main gas containment volume.

As the gas containment is being emptied, hydraulic compensation liquid is caused (by gravity or pumping or both) to flow from the external storage volume via the sequence of settling volumes. As it does so, any gas remaining in those settling volumes is gradually dissolved into the liquid and the fraction of each settling volume occupied by the liquid increases steadily until it reaches 100%.

As the gas containment is being refilled with pressurised gas, hydraulic compensation liquid is allowed to flow back out of the containment. The power associated with the flow of this pressurised liquid is absorbed in separate steps as the liquid passes to each decreasing intermediate pressure. At each intermediate pressure, some gas bubbles out of the liquid and this gas occupies the upper portion of the respective settling volumes. During this process, the fraction of each settling volume occupied by the liquid tends to decrease steadily. In any one settling volume, when the liquid level has fallen to a set level (which might typically be 50% of the settling volume), a small gas compressor acts to draw-off gas at the intermediate pressure and compress it back up to the next highest intermediate pressure. In the case of the settling volume at a pressure closed to the gas storage pressure, the small gas compressor discharges the gas back into the main containment.

Control is applied, if necessary, to ensure that the intermediate pressures remain fairly evenly distributed between gas storage pressure in the main containment and ambient pressure.

Embodiments of the invention have obvious but distinct implementations relating to the three different contexts.

In the first implementation, there is no significant height difference between the containment for the pressurised gas and the external storage volume for the hydraulic compensation liquid.

In the second implementation, there is a significant height difference between the containment for the pressurised gas and the external storage volume for the hydraulic compensation liquid such that the manostatic (hydrostatic) pressure associated with the height difference accounts for most or all of the pressure difference between the gas storage pressure and ambient pressure.

In the third implementation, the gas storage is deep underwater and the entire surrounding water forms the external storage volume for the hydraulic compensation liquid.

In any implementation of this invention, it will tend to be the case that having more intermediate pressures (and associated settling volumes) will generally improve the overall performance. The marginal benefits of deploying more intermediate pressures decrease as the number increases. System costs will tend to militate against having very high numbers of intermediate pressures and associated settling volumes.

It is noteworthy that the total power required for the pumps delivering hydraulic compensation liquid into the main gas containment is the same irrespective of the number of intermediate pressures (and associated settling volumes). These pumps would normally be positive-displacement devices driven via independent reversible electric motor/generator units. Then, by controlling the torque in the machines, the intermediate pressures of the hydraulic compensation liquid in the settling volumes are automatically controlled.

A new system for storing a gas at a constant raised pressure includes a main gas containment containing the gas at the constant raised pressure and a portion of a hydraulic compensation liquid, an external storage volume at a lower pressure than the constant raised pressure, containing a second portion of the hydraulic compensation liquid, a series of two or more settling volumes, each of the two or more settling volumes containing some gas and a further portion of the hydraulic compensation liquid and being at a different discrete intermediate pressure between the constant raised pressure and the lower pressure of the external storage volume, each of the two or more settling volumes, after a first, highest pressure settling volume, having a lower pressure than an immediately preceding settling volume in the series, two or more gas connections, the two or more gas connections including a first gas connection between an upper portion of the main gas containment and an upper portion of the highest pressure settling volume and one or more second gas connections, which include a gas connection between an upper portion of each of the two or more settling volumes, after the first, highest pressure settling volume, and the immediately preceding settling volume in the series, and three or more liquid connections, the three or more liquid connections including a first liquid connection between a lower portion of the main gas containment and a lower portion of the highest pressure settling volume, one or more second liquid connections, which include a liquid connection between lower portions of each of the two or more settling volumes, after the first, highest pressure settling volume, and the immediately preceding settling volume in the series, and a third liquid connection between a lower portion of a last, lowest pressure settling volume and a lower portion of the external storage volume.

The new system in some implementations also includes two or more compressors each associated with one of the two or more gas connections and being configured to transfer gas from the lower pressure side to the higher pressure side of the associated gas connection and three or more pumps each associated with one of the three or more liquid connections and being configured to drive liquid from the lower pressure side to the higher pressure side of the associated liquid connection.

In some such implementations, one or more of the three or more pumps are positive displacement pumps configured such that when hydraulic compensation liquid is flowing from the main gas containment towards the external storage volume the positive displacement pumps recover work from the liquid.

In some such implementations (with or without the pumps being positive displacement pumps), one or more of the two or more gas connections includes an associated valve operable to prevent return of gas from the higher pressure side to the lower pressure side of the associated gas connection.

In some implementations of the new system, the liquid includes, or is, water.

In some implementations of the new system, the main gas containment is underwater in an open body of water that acts as the external storage volume of liquid.

In some implementations of the new system, the gas being stored at constant raised pressure is air.

A new system for storing a gas at constant raised pressure includes a main gas containment configured to receive gas from a pressurized gas manifold and to return gas to the pressurized gas manifold, and containing a hydraulic compensation liquid, a first pump/motor through which the hydraulic compensation liquid can enter and leave the main gas containment, where the hydraulic compensation liquid is in communication with a first settling volume on the other side of the pump/motor from the main gas containment, a first gas compressor configured to drive gas from the first settling volume back into the pressurized gas manifold, a second settling volume, where the first settling volume is in communication with the second settling volume via a second pump/motor through which the hydraulic compensation liquid can pass between the first and second settling volumes, a second gas compressor configured to drive gas from the second settling volume back into the first settling volume, a third settling volume, where the second settling volume is in communication with the third settling volume via a third pump/motor through which the hydraulic compensation liquid can pass between the second and third settling volumes, a third gas compressor configured to drive gas from the third settling volume back into the second settling volume, and an external storage volume, where the third settling volume is in communication with the external storage volume via a baseline pump/motor through which the hydraulic compensation liquid can pass between the third settling volume and the external storage volume. The main gas containment is at a higher pressure than the first settling volume, the first settling volume is at a higher pressure than the second settling volume, the second settling volume is at a higher pressure than the third settling volume, and the third settling volume is at a higher pressure than the external storage volume.

In some implementations of the new system, the first, second, third, and baseline pump/motors are configured to extract power from the hydraulic compensation liquid as it flows away from the main gas containment when the main gas containment is receiving gas from the pressurized gas manifold.

In some implementations of the new system, the first, second, third, and baseline pump/motors are configured to extract power from the hydraulic compensation liquid as it flows away from the main gas containment when the main gas containment is receiving gas from the pressurized gas manifold.

In some implementations the new system also includes non-return valves configured to prevent gas flow from higher pressure origins into the first, second, and third settling volumes.

In some implementations of the new system a bottom of the first settling volume is above a bottom of the main gas containment, a bottom of the second settling volume is above the bottom of the first settling volume, a bottom of the third settling volume is above the bottom of the second settling volume, and a bottom of the external storage volume is above the bottom of the third settling volume, and the hydraulic compensation liquid must pass first rise and then fall as it passes through each of the first, second, and third settling volumes.

In some implementations of the new system the main gas containment is underwater in a body of water and the body of water is the external storage volume.

In some implementations of the new the hydraulic compensation liquid includes or is water.

In some implementations of the new system the main gas containment comprises a set of discrete storage volumes.

A new system for storing a gas at constant raised pressure includes a main gas containment configured to receive gas from a pressurized gas manifold and to return gas to the pressurized gas manifold, and containing a hydraulic compensation liquid, where the hydraulic compensation liquid is in communication with a first settling volume, a first gas compressor configured to drive gas from the first settling volume back into the pressurized gas manifold, a second settling volume, where the first settling volume is in communication with the second settling volume such that the hydraulic compensation liquid can pass between the first and second settling volumes, a second gas compressor configured to drive gas from the second settling volume back into the first settling volume, a third settling volume, where the second settling volume is in communication with the third settling volume such that the hydraulic compensation liquid can pass between the second and third settling volumes, a third gas compressor configured to drive gas from the third settling volume back into the second settling volume, and an external storage volume, where the third settling volume is in communication with the external storage volume such that the hydraulic compensation liquid can pass between the third settling volume and the external storage volume, where the main gas containment is at a higher pressure than the first settling volume, the first settling volume is at a higher pressure than the second settling volume, the second settling volume is at a higher pressure than the third settling volume, and the third settling volume is at a higher pressure than the external storage volume, where a bottom of the first settling volume is above a bottom of the main gas containment, a bottom of the second settling volume is above the bottom of the first settling volume, a bottom of the third settling volume is above the bottom of the second settling volume, and a bottom of the external storage volume is above the bottom of the third settling volume, where the hydraulic compensation liquid must pass first rise and then fall as it passes through each of the first, second, and third settling volumes.

DETAILED DESCRIPTION

Figure 1:
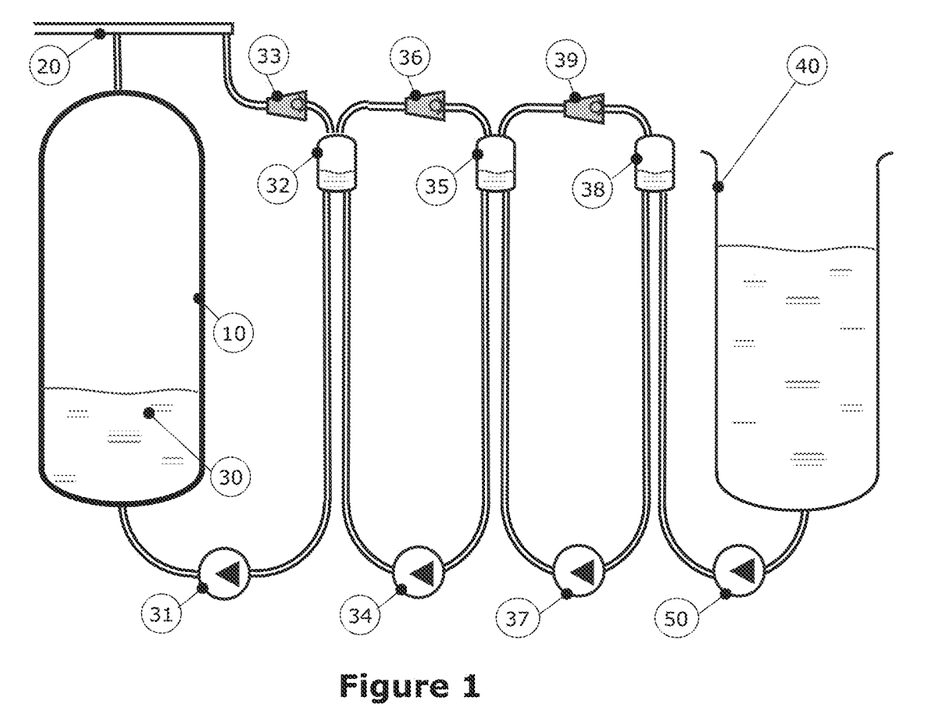
FIG. 1 illustrates three settling volumes for the hydraulic compensation liquid between the main gas storage containment and the external storage volume for the liquid, according to at least one embodiment of the disclosure.

A first embodiment of the invention is disclosed here through FIG. 1. A main gas containment (10) receives gas from a pressurised gas manifold (20) and can return gas to that manifold. The lowest part of the containment (10) is filled with hydraulic compensation liquid (30). This liquid (30) can enter/leave the containment (10) only by passing though a first reversible positive-displacement pump/motor (31). On the other side of this first reversible positive-displacement pump/motor (31), the fluid is in communication with a first settling volume (32). Associated with this first settling volume (32) is a first small gas compressor (33) capable of driving gas at the first intermediate pressure back into the pressurised gas manifold (20).

The first settling volume (32) is in communication with a second settling volume (35) via a second reversible positive-displacement pump/motor (34). The only way that hydraulic compensation liquid can pass between the first and second settling volumes ((32) and (35)) is via that second reversible positive-displacement pump/motor (34). Associated with the second settling volume (35) is a second small gas compressor (36) capable of driving gas at the second intermediate pressure back into the top of the first settling volume (32).

The second settling volume (35) is in communication with a third settling volume (38) via a third reversible positive-displacement pump/motor (37). The only way that hydraulic compensation liquid can pass between the second and third settling volumes ((35) and (38)) is via that third reversible positive-displacement pump/motor (37). Associated with the third settling volume (38) is a third small gas compressor (39) capable of driving gas at the third intermediate pressure back into the top of the second settling volume (35).

The third settling volume (38) is in communication with an external storage volume (40) for holding hydraulic compensation liquid via a baseline reversible positive-displacement pump/motor (50). The only way that hydraulic compensation liquid can pass between the third settling volume (38) and the external storage volume (40) is via that baseline reversible positive-displacement pump/motor (50).

During the process of charging the main gas containment (10), gas enters this containment via the pressurised gas manifold (20) and the hydraulic compensation liquid (30) leaves the containment in order to ensure that the pressure remains constant. The hydraulic compensation liquid passes through the first reversible pump/motor unit (31) and power is extracted from the flowing liquid as the pressure drops. The liquid then enters the first settling volume (32) and some gas escapes from the liquid and floats into the upper part of that settling volume. If the liquid level in that storage volume falls below a certain pre-determined level, gas compressor (33) acts to draw gas out of that storage volume and drive it back into the pressurised gas manifold (20).

The hydraulic compensation liquid then passes through the second reversible pump/motor unit (34) and more power is extracted from the flowing liquid as the pressure drops further. The liquid then enters the second settling volume (35) and some more gas escapes from the liquid and floats into the upper part of that settling volume. If the liquid level in that storage volume falls below a certain pre-determined level, gas compressor (36) acts to draw gas out of that storage volume and drive it back into the first settling volume (32).

The hydraulic compensation liquid then passes through the third reversible pump/motor unit (36) and still more power is extracted from the flowing liquid as the pressure drops still further. The liquid then enters the third settling volume (38) and some more gas escapes from the liquid and floats into the upper part of that settling volume. If the liquid level in that storage volume falls below a certain pre-determined level, gas compressor (39) acts to draw gas out of that storage volume and drive it back into the second settling volume (35).

Finally, hydraulic compensation liquid then passes through the baseline reversible pump/motor (50) surrendering the last of the available power in that liquid before entering the external storage volume (40). It is worth noting that some gas would then escape at ambient pressure.

The process of discharging the main pressurised gas containment is almost exactly the reverse of the process of charging with one key difference. In the charging process, gas continuously released from the hydraulic compensation liquid as it falls in pressure and most of that gas is compressed back up to the storage pressure and fed back into the main gas manifold (20). During discharging, the compressors ((33), (36) and (39)) do not act in reverse as expanders and neither does any gas flow back into the settling volumes from higher-pressure origins. In fact, these compressors could be fitted with non-return valves to prevent such flows. Each one of the settling volumes gradually becomes emptied of the gas present in it until there is no further gas present in the settling volume.

Figure 2:
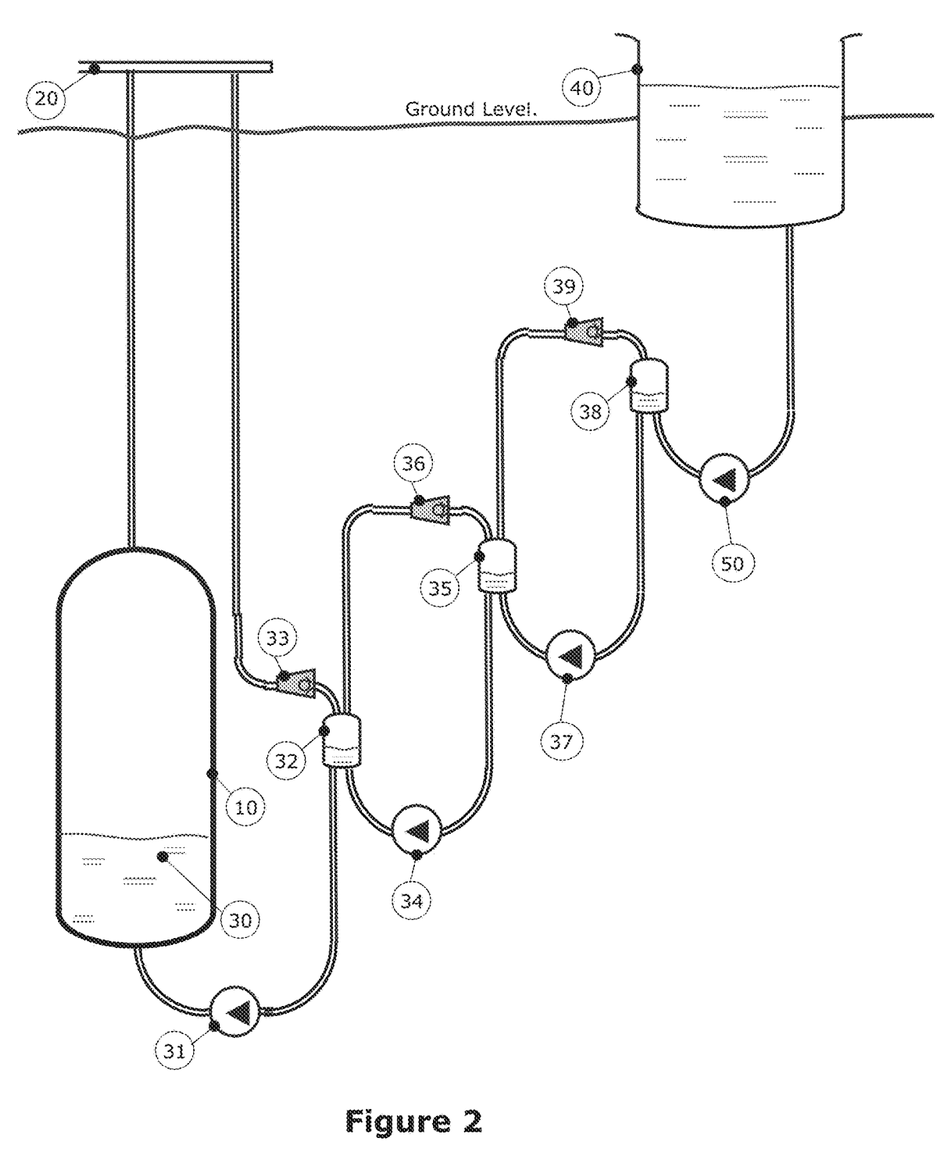
FIG. 2 shows an implementation where a significant source of pressure in the hydraulic compensation liquid arises due to manostatic (hydrostatic) pressure head, according to at least one embodiment of the disclosure.

A second embodiment of the invention is disclosed through the use of FIG. 2.

Conceptually, this is identical to the first embodiment except that the mechanism by which pressure increases or decreases occur in the hydraulic compensation liquid is via hydrostatic head rather than via pumping (to increase pressure) or the operation of a hydraulic motor (to decrease pressure). Importantly, the settling volumes ((32), (35) and (38)) are located at local maxima of elevation so that the hydraulic compensation liquid must first rise and then fall as it passes through each one of the settling volumes. This provides the essential opportunity for dissolved gas to escape and to accumulate at these points.

Figure 3:
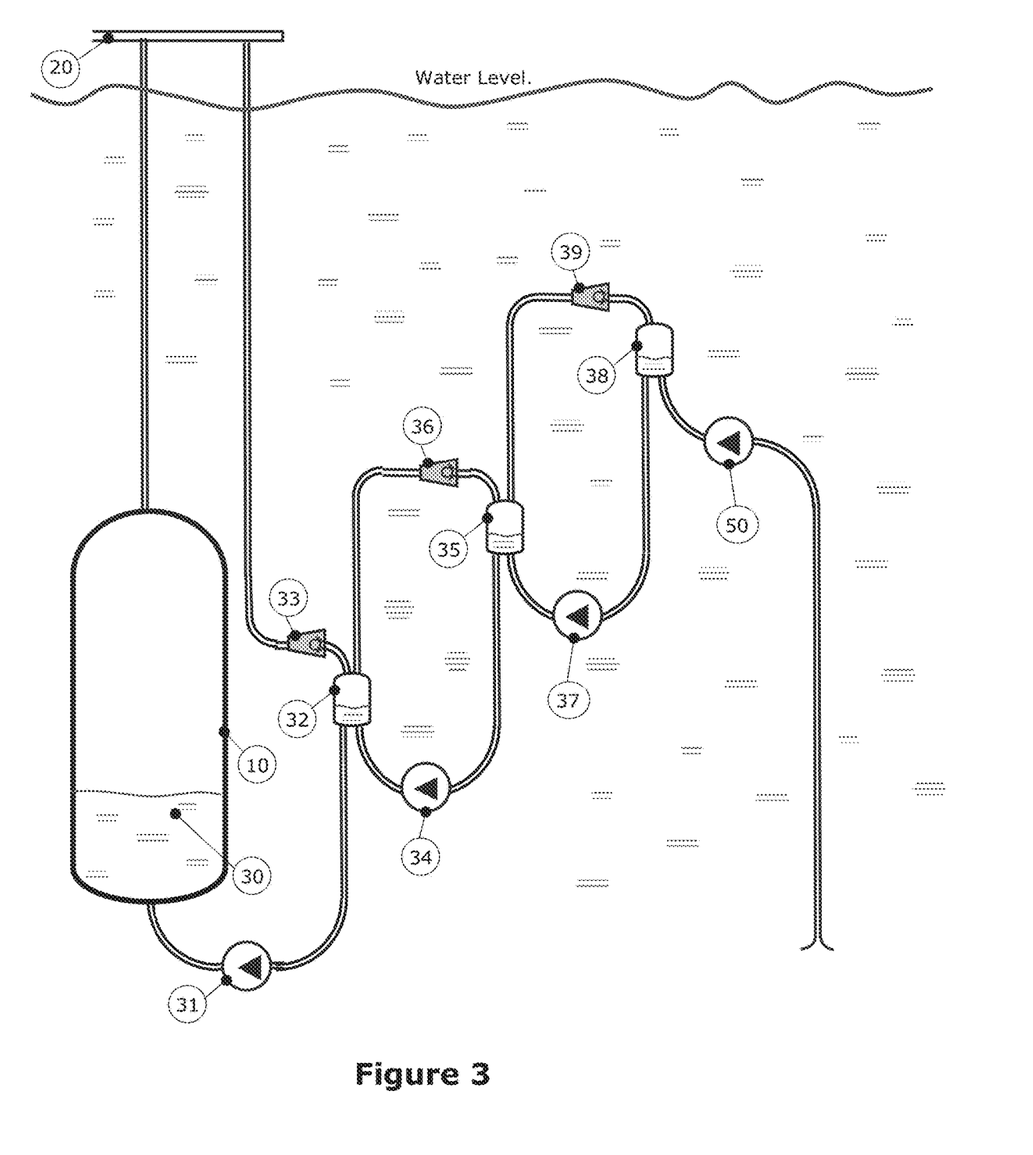
FIG. 3 shows an implementation for underwater storage of compressed air, according to at least one embodiment of the disclosure where there is a significant source of pressure in the hydraulic compensation liquid due to manostatic (hydrostatic) pressure head. There may be no specific external storage volume for the hydraulic compensation liquid in this realisation as the entire body of surrounding water may play that role.

A third embodiment of the invention is disclosed using FIG. 3. Conceptually, this is minor further development over the second embodiment. In this embodiment, the main gas containment (1) is held deep underwater. This has major advantages in that the external hydrostatic pressure of the water obviates the requirement for large amounts of structural material in the gas containment. In this case, the external storage volume for the hydraulic compensation liquid is normally the entire body of water surrounding the containment.

To implement the present invention in the context of deep underwater storage of gas, it is only necessary to observe that the path taken by the hydraulic compensation liquid should involve it passing back up to the surface of the water so that the pressure in that liquid falls back to ambient pressure. In nearly all practical cases, the hydraulic compensation liquid would be the same water as the water surrounding the gas containment but it does not have to be. When there is a difference, the actual hydraulic compensation liquid can itself be held in a flexible containment either floating atop the main body of water (if it is lighter than the local water) or at the bed of the water body (if it is heavier than the local water).

The invention has been explained in the above embodiments using three intermediate settling volumes ((32), (35) and (38)) but it will be obvious that fewer or more of these could be used and the principles of the invention are the same irrespective of whether the number is as low as 1 or as high as 10 or more. In most practical implementations The main gas containment (10) has been illustrated in FIGS. 1, 2 and 3 as a single containment volume but it is clear that this can be implemented as a set of discrete storage volumes.

In FIGS. 2 and 3, reversible pump/motor units have been shown in the connection between the main gas containment and the first settling volume (32), in the connections between the settling volumes ((32)-(35) and (35)-(38)) and in the connection between the final settling volume (38) and the external storage volume (40). Obviously, some or all of the pressure differences required in these different connections can be achieved from hydrostatic head and this is especially relevant in contexts such as embodiment #3 where the main gas containment is deep underwater.

In the descriptions of the three embodiments above, no settling volume has the same pressure as atmospheric pressure. In cases where the gas itself has a value and/or where it has the potential to do environmental harm, some implementations might include a baseline settling volume at atmospheric pressure so that gas that was still dissolved in the hydraulic compensation liquid prior to that liquid passing through the baseline reversible pump/motor unit (50) in the direction of reducing pressure could be captured.

The text in the above description has implied that all gas emerging from the hydraulic compensation liquid as it becomes de-pressurised in stages should be compressed back using small standalone compressors such that it all ends back up in the main gas containment. There is a distinct option here that potentially avoids the requirement for some of the standalone gas compressors. That separate option is that the main gas compression train will itself have points in it at intermediate pressures between full gas storage pressure and ambient. In some cases, it might be convenient to feed the gas emerged from dissolution back into points in the main compression cycle. This potentially saves some significant capital costs.

The invention claimed is:

1. A system for storing a gas at a constant raised pressure, the system comprising:
   a main gas containment containing the gas at the constant raised pressure and a portion of a hydraulic compensation liquid;
   an external storage volume at a lower pressure than the constant raised pressure, containing a second portion of the hydraulic compensation liquid;
   a series of two or more settling volumes, each of the two or more settling volumes containing some gas and a further portion of the hydraulic compensation liquid and being at a different discrete intermediate pressure between the constant raised pressure and the lower pressure of the external storage volume;
   wherein each of the two or more settling volumes, after a first, highest pressure settling volume, has a lower pressure than an immediately preceding settling volume in the series;
   two or more gas connections, the two or more gas connections comprising:
      a first gas connection between an upper portion of the main gas containment and an upper portion of the highest pressure settling volume; and
      one or more second gas connections, comprising a gas connection between an upper portion of each of the two or more settling volumes, after the first, highest pressure settling volume, and the immediately preceding settling volume in the series; and
   three or more liquid connections, the three or more liquid connections comprising:
      a first liquid connection between a lower portion of the main gas containment and a lower portion of the highest pressure settling volume;
      one or more second liquid connections, comprising a liquid connection between lower portions of each of the two or more settling volumes, after the first, highest pressure settling volume, and the immediately preceding settling volume in the series; and
      a third liquid connection between a lower portion of a last, lowest pressure settling volume and a lower portion of the external storage volume.

2. The system for storing a gas at a constant raised pressure according to claim 1, further comprising:
   two or more compressors each associated with one of the two or more gas connections and being configured to transfer gas from the lower pressure side to the higher pressure side of the associated gas connection; and
   three or more pumps each associated with one of the three or more liquid connections and being configured to drive liquid from the lower pressure side to the higher pressure side of the associated liquid connection.

3. The system for storing a gas at a constant raised pressure according to claim 2, wherein one or more of the three or more pumps are positive displacement pumps configured such that when hydraulic compensation liquid is flowing from the main gas containment towards the external storage volume the positive displacement pumps recover work from the liquid.

4. The system for storing a gas at a constant raised pressure according to claim 2, wherein one or more of the two or more gas connections comprises an associated valve operable to prevent return of gas from the higher pressure side to the lower pressure side of the associated gas connection.

5. The system for storing gas at constant raised pressure according to claim 1, wherein the liquid comprises water.

6. The system for storing gas at constant raised pressure according to claim 5, wherein the liquid consists of water.

7. The system for storing gas at constant raised pressure according to claim 1, wherein the main gas containment is underwater in an open body of water that acts as the external storage volume of liquid.

8. The system for storing gas at constant raised pressure according to claim 1, wherein the gas being stored at constant raised pressure is air.

9. A system for storing a gas at constant raised pressure, the system comprising:
  a main gas containment configured to receive gas from a pressurized gas manifold and to return gas to the pressurized gas manifold, and containing a hydraulic compensation liquid;
  a first pump/motor through which the hydraulic compensation liquid can enter and leave the main gas containment, wherein the hydraulic compensation liquid is in communication with a first settling volume on the other side of the pump/motor from the main gas containment;
  a first gas compressor configured to drive gas from the first settling volume back into the pressurized gas manifold;
  a second settling volume, wherein the first settling volume is in communication with the second settling volume via a second pump/motor through which the hydraulic compensation liquid can pass between the first and second settling volumes;
  a second gas compressor configured to drive gas from the second settling volume back into the first settling volume;
  a third settling volume, wherein the second settling volume is in communication with the third settling volume via a third pump/motor through which the hydraulic compensation liquid can pass between the second and third settling volumes;
  a third gas compressor configured to drive gas from the third settling volume back into the second settling volume; and
  an external storage volume, wherein the third settling volume is in communication with the external storage volume via a baseline pump/motor through which the hydraulic compensation liquid can pass between the third settling volume and the external storage volume;
  wherein the main gas containment is at a higher pressure than the first settling volume, the first settling volume is at a higher pressure than the second settling volume, the second settling volume is at a higher pressure than the third settling volume, and the third settling volume is at a higher pressure than the external storage volume.

10. The system for storing gas at constant raised pressure according to claim 9, wherein the first, second, third, and baseline pump/motors are configured to extract power from the hydraulic compensation liquid as it flows away from the main gas containment when the main gas containment is receiving gas from the pressurized gas manifold.

11. The system for storing gas at constant raised pressure according to claim 9, wherein the first, second, third, and baseline pump/motors are configured to extract power from the hydraulic compensation liquid as it flows away from the main gas containment when the main gas containment is receiving gas from the pressurized gas manifold.

12. The system for storing gas at constant raised pressure according to claim 9, further comprising non-return valves configured to prevent gas flow from higher pressure origins into the first, second, and third settling volumes.

13. The system for storing gas at constant raised pressure according to claim 9, wherein a bottom of the first settling volume is above a bottom of the main gas containment, a bottom of the second settling volume is above the bottom of the first settling volume, a bottom of the third settling volume is above the bottom of the second settling volume, and a bottom of the external storage volume is above the bottom of the third settling volume, wherein the hydraulic compensation liquid must pass first rise and then fall as it passes through each of the first, second, and third settling volumes.

14. The system for storing gas at constant raised pressure according to claim 9, wherein the main gas containment is underwater in a body of water and the body of water is the external storage volume.

15. The system for storing gas at constant raised pressure according to claim 13, wherein the hydraulic compensation liquid is water.

16. The system for storing gas at constant raised pressure according to claim 9, wherein the main gas containment comprises a set of discrete storage volumes.

17. A system for storing a gas at constant raised pressure, the system comprising:
  a main gas containment configured to receive gas from a pressurized gas manifold and to return gas to the pressurized gas manifold, and containing a hydraulic compensation liquid, wherein the hydraulic compensation liquid is in communication with a first settling volume;
  a first gas compressor configured to drive gas from the first settling volume back into the pressurized gas manifold;
  a second settling volume, wherein the first settling volume is in communication with the second settling volume such that the hydraulic compensation liquid can pass between the first and second settling volumes;
  a second gas compressor configured to drive gas from the second settling volume back into the first settling volume;
  a third settling volume, wherein the second settling volume is in communication with the third settling volume such that the hydraulic compensation liquid can pass between the second and third settling volumes;
  a third gas compressor configured to drive gas from the third settling volume back into the second settling volume; and
  an external storage volume, wherein the third settling volume is in communication with the external storage volume such that the hydraulic compensation liquid can pass between the third settling volume and the external storage volume;
  wherein the main gas containment is at a higher pressure than the first settling volume, the first settling volume is at a higher pressure than the second settling volume, the second settling volume is at a higher pressure than the third settling volume, and the third settling volume is at a higher pressure than the external storage volume;
  wherein a bottom of the first settling volume is above a bottom of the main gas containment, a bottom of the second settling volume is above the bottom of the first settling volume, a bottom of the third settling volume is above the bottom of the second settling volume, and a bottom of the external storage volume is above the bottom of the third settling volume, wherein the hydraulic compensation liquid must pass first rise and then fall as it passes through each of the first, second, and third settling volumes.

\* \* \* \* \*